Patented June 26, 1945

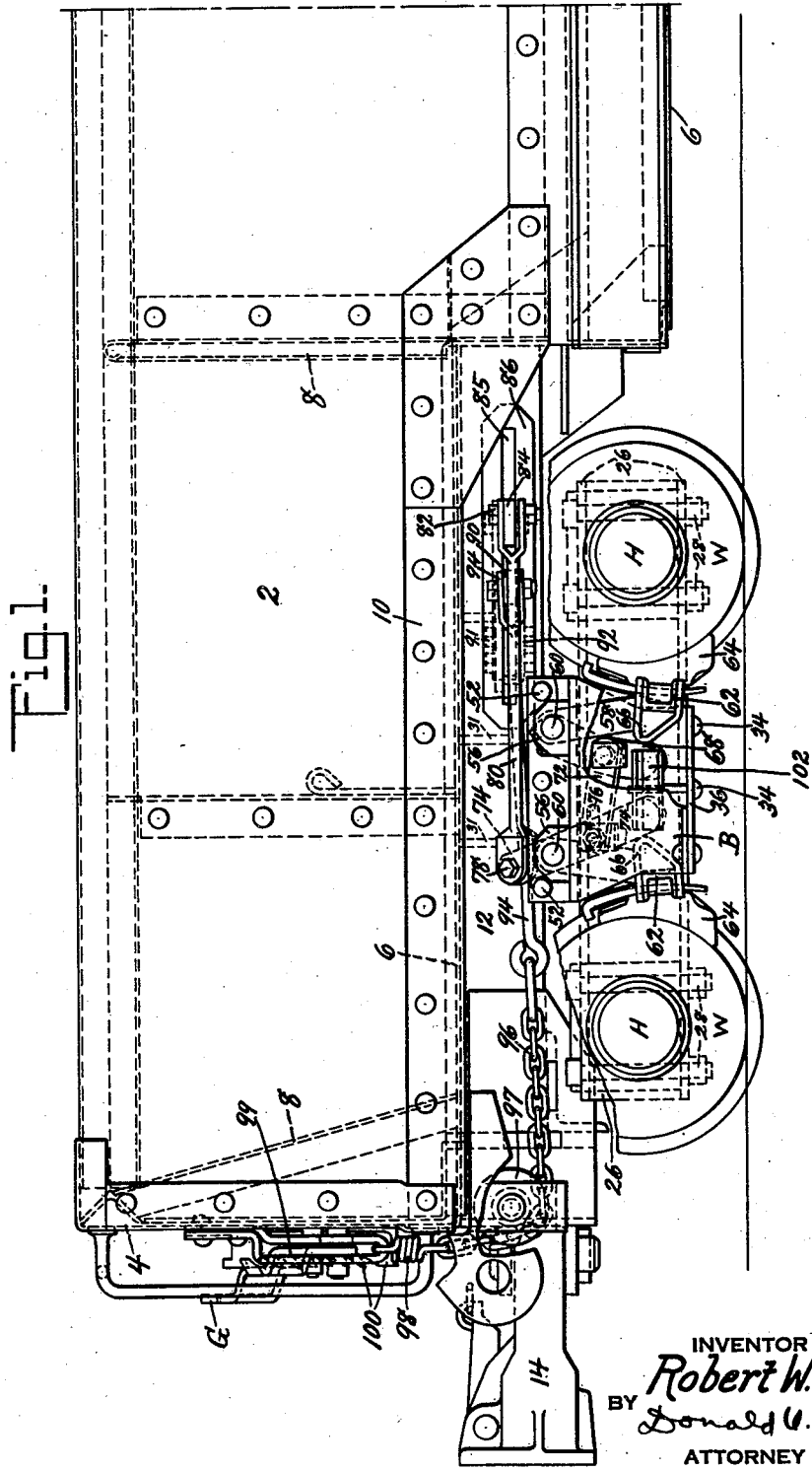

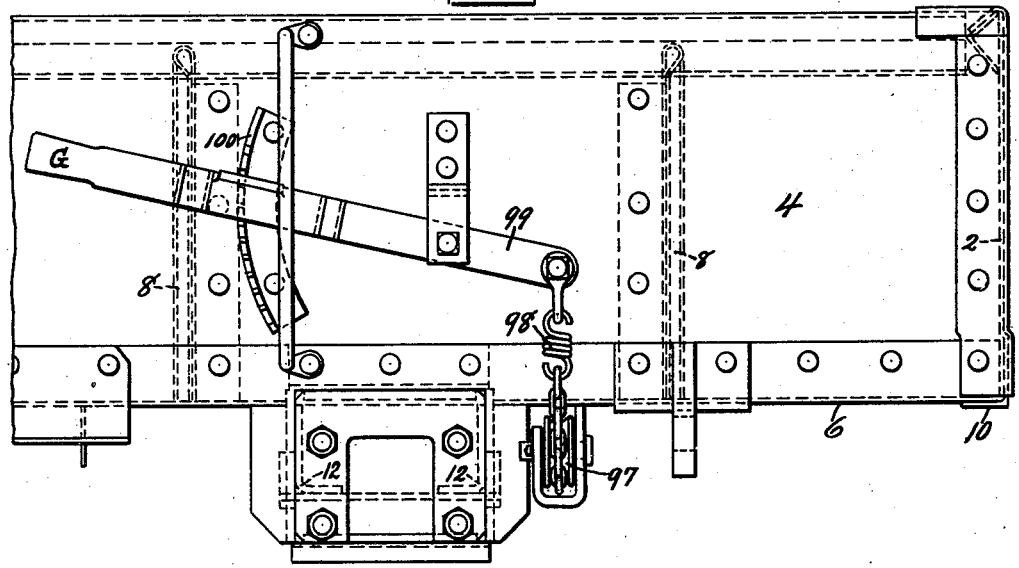
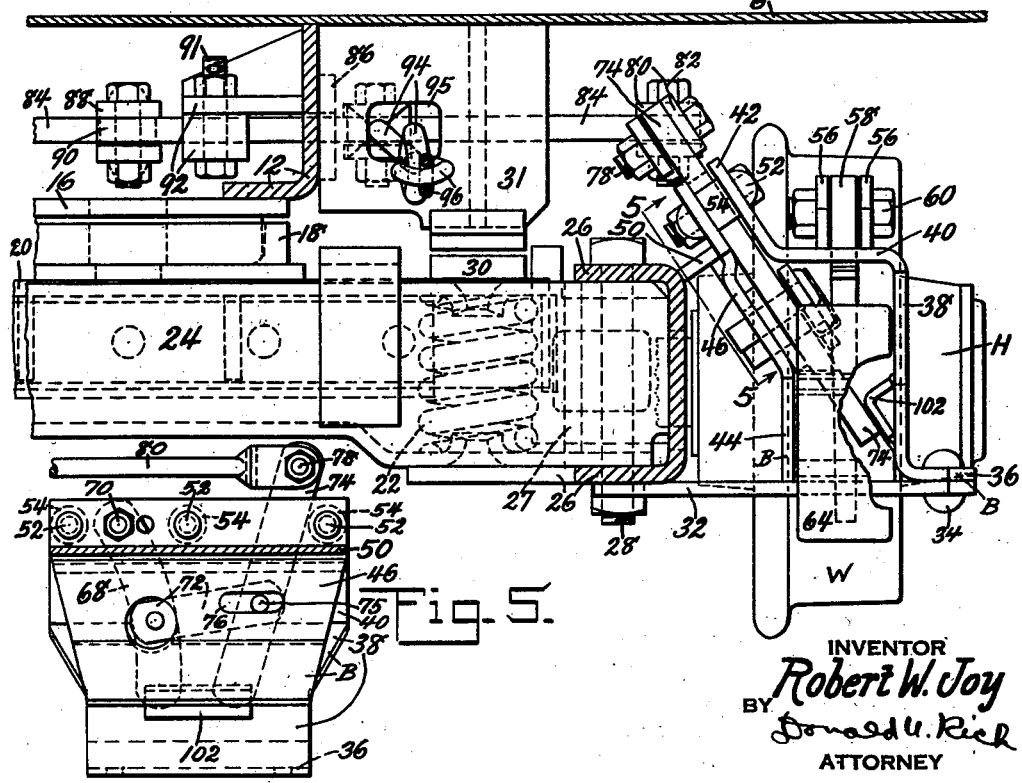

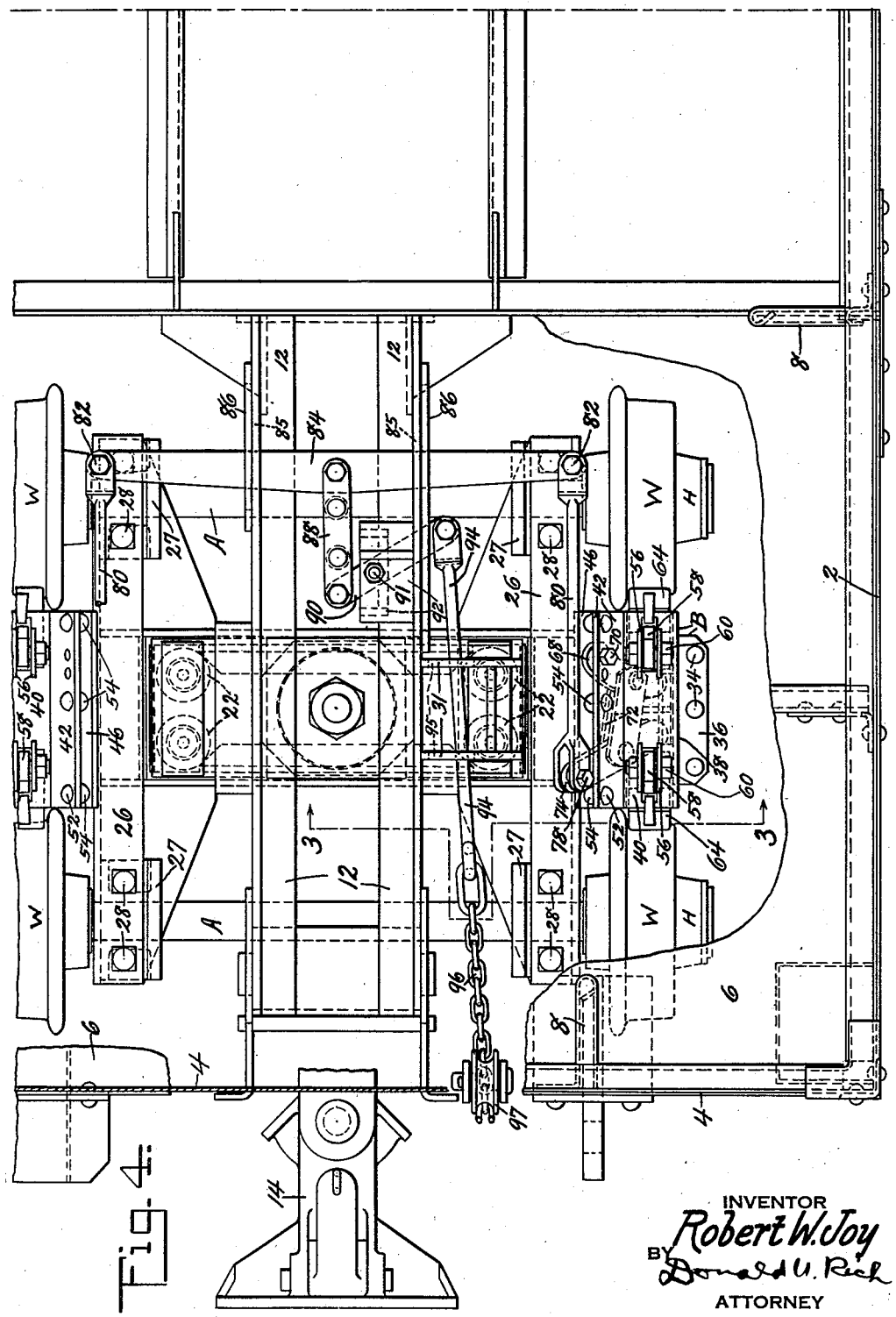

2,379,084

UNITED STATES PATENT OFFICE 2,379,084

CAR TRUCK BRAKE

Robert W. Joy, Berwick, Pa., assignor to American Car and Foundry Company, New York, N. Y., a corporation of New Jersey Application September 16, 1942, Serial No. 458,485

9 Claims. (Cl. 188—55)

This invention relates to brakes in general and in particular to brakes for use on trucks of small size generally used under mine or other industrial cars.

In industrial use the trucks supporting the car bodies must be of as small and compact a design as possible in order to cut down the wheel base since in most cases they must operate over tracks having extremely sharp curves. Most of the trackage in mines and industrial plants cannot be located in any position giving a large amount of clearance and any truck must be arranged with all parts as compact as possible in order to clear trackside obstructions. It is an object, therefore, of the present invention to provide a car truck and brake requiring a minimum of space and with the brake parts located wholly within the clearance line of the truck.

A further object of the invention is the provision of a brake applicable to trucks of extremely short wheel base.

A still further object of the invention is the provision of a brake mechanism of extremely simple, strong and rugged construction.

These and other objects of the invention will be apparent to persons skilled in the art from a study of the following description and accompanying drawings, in which Figure 1 is an elevational view of substantially one-half of the car;

Fig. 2 is an end view of the car shown in Fig. 1;

Fig. 3 is a sectional view taken substantially on line 3—3 of Fig. 4;

Fig. 4 is a plan view of the car and truck with parts broken away to better disclose the truck construction, and Fig. 5 is a sectional view taken substantially on line 5—5 of Fig. 3.

Referring now to the drawings in detail, it will be seen that the car body is composed of sides 2, ends 4 and multi-level bottom 6. The sides and ends are braced by means of gussets 8, while the floor is supported by longitudinal members 10. The raised end portions of the car bottom are supported on longitudinally extending draft sills 12 adapted to receive the automatic coupler 14. The draft sills also serve as center sills and have attached thereto the body center plate 16 which is adapted to rest within the truck center plate 18, best shown in Fig. 3. The truck center plate is supported on a bolster member 20 which in turn is supported upon springs 22 resting upon a spring plank element 24, which element also ties the truck side frames rigidly together. The truck side frames are of channel construction having the flanges 26 directed inwardly toward the center of the car and receiving therebetween bearings 27 held in place by bolts 28. The bearings are adapted to receive the axles A which extend through the side frames and are mounted in supporting wheels W. The bearings are preferably located in the wheels and are protected by the wheel hubs H which define the outer clearance line of the truck. Rocking of the car body is controlled by means of side bearings 30 secured to the truck bolster and to plates 31 fastened on the car body by any suitable means such as welding.

In order to support portions of the brake rigging brackets B are attached to the truck side frames between the spaced wheels W. Each of these brackets are formed of a plurality of plates, as clearly shown in Figs. 1, 3 and 4. The bottom plate 32 of the bracket has its inner end secured to the bottom flange of the truck frame and extends outwardly substantially to the clearance limits of the truck. At its outer end it has attached thereto as by rivets 34 a flange 36 of a deformed W plate. Leg 38 of this plate extends vertically substantially in the plane of the outer edge of the wheel tread surface and terminates in an inwardly directed horizontal leg 40 which in turn terminates in an inwardly and upwardly inclined flange 42. A second angular plate is provided having one leg 44 attached to an intermediate portion of the bottom plate 32 and a second leg 46 inclined inwardly and upwardly substantially parallel to the flange 42 but in spaced relation thereto. This leg 46 is attached to the upper portion of the adjacent truck side frame by means of a short connecting plate 50. The otherwise free end of flange 42 is attached to leg 46 by means of rivets 52 extending through the plates and through spacing collars 54, thus firmly attaching the plates together yet holding the flanges in spaced relation to each other. The leg 40 of the distorted W-shaped plate is provided adjacent its edges with spaced upstanding ears 56 adapted to receive therebetween a brake hanger link 58 held in position by means of a bolt 60 extending therethrough and through the ears 56. The lower ends of the brake hangers are connected to brake shoe heads 62 which in turn have keyed thereto brake shoes 64. Each of the brake shoe heads is provided with a curved extension 66 adapted to be engaged by the lower ends of the truck levers later to be described. The truck dead lever 68 has its upper end extending between the flanges 42 and 46 and is held in position by bolt or other means 70, while the lower end, as previously stated, bears against the rounded end of the associate brake shoe head. The intermediate portion of the dead lever is pin-connected to one end of a compression link 72, the other end being pin-connected to the intermediate portion of a floating live lever 74. The pin 75 which connects the compression link and live lever is extended into a slot 76 formed in the inclined leg 46 of one of the bracket forming plates, thus supporting the lever 74 for translatory movement relative to the plate. As previously stated, the lower end of this live lever bears against the rounded end of the associated brake shoe head. The upper ends of the live levers 74 extend inwardly above the truck side frames and are connected as by bolts 78 to one end of a pull rod 80, the other end of which is connected by bolts or pins 82 to the end of an equalizer 84. This equalizer is supported by the car body draft or center sills through the medium of slots 85 formed in the draft sills and reinforced by plates 86. The intermediate portion of the equalizer is pin-connected to a push link 88 which in turn is pin-connected to one end of a lever 90. The intermediate portion of the lever 90 is pivotally mounted by a bolt or pin 91 on a bracket 92 attached to the draft or center sills between the sides thereof. The opposite end of the lever 90 is pin-connected to a rod 94 extending through openings 95 in the side bearing attaching plates 31. The free end of the rod 94 is connected to a chain or other flexible means 96 running to the end of the car and then around pulley 97 and upwardly for connection to a spring or other resilient means 98. This spring is connected to one end of an operating lever 99 pivoted intermediate its ends on the car end wall and adapted to engage a ratchet segment 100 located on the car end wall adjacent the handle portion G.

It will be seen from the preceding description that an extremely simple and rigid brake has been provided with all parts located wholly within the clearance limits of the truck as defined by the wheel hubs and that the truck levers, brake shoes and hangers are carried by and housed within brackets carried by the truck side frames intermediate the spaced wheels. In operation it will be seen that application of a downward force to the handle G will cause movement of the flexible means 96 and transmit a pull causing rotation of lever 90 in a clockwise direction as viewed in Fig. 4. This movement will place link 88 in compression and force the equalizer lever 84 toward the center of the car, thus placing pull rods 80 in tension and rocking the live levers. Since their motion will be opposed by the associated brake shoe engaging the wheel, the compression link 72 will transmit power moving the dead lever and forcing its associated shoe into engagement with the adjacent wheel. Full equalization is obtained through equalizer 84 and through the live lever 74 which may pivot as well as slide in slot 76 of the bracket forming plate leg 46. Since the live lever 74 is floating in the bracket a thrust member 102 of angular formation is welded or otherwise secured to vertical leg 38 of the distorted W-shaped plate previously referred to. This thrust member will take any upward thrust of the live lever and prevent the digging of the live lever end into the bracket forming plate, thereby insuring a smooth motion and proper equalization between the live lever and dead lever. Normally, the brakes will be applied with sufficient power to extend spring 98 a considerable amount and this spring will constantly urge the brakes toward engaged position with the shoes while at the same time preventing breakage of the brake mechanism through application of excessive power. The energy stored in the stretched spring 98 will, as previously stated, constantly urge the brakes toward an on position and will hold the brakes in tight engagement with the wheels during swinging of the truck. It is to be noted that the slight tendency towards applying or releasing the brakes occasioned by the off center relation of the connection between the link 88 and lever 90 will be absorbed by the spring without in any way damaging the brake mechanism.

While the mechanism has been described more or less in detail with specific reference to the drawings, it will be obvious that various modifications and rearrangements of parts may be made and all such modifications and rearrangements of parts are contemplated as will fall within the scope of the appended claims defining my invention.

What is claimed is:

1. The combination with a car body pivotally mounted on a supporting truck including spaced apart wheels and axles, brackets secured to the truck side frames and projecting laterally outward into the space between the wheels, brake shoes supported by said brackets in position to engage the wheels, brake levers carried by said brackets and engageable with said brake shoes, said brake levers being inclined inwardly and upwardly to position their inner ends substantially above the truck side frames, and actuating means carried by the car body and operably connected to the inner ends of said brake levers.

2. The combination with a car body pivotally mounted on a supporting truck including spaced apart wheels and axles, brackets secured to the truck side frames and projecting laterally outward into the space between the wheels, brake rigging carried by the car body, and truck carried brake rigging operably connected to the car body carried brake rigging, said brackets forming the sole support for the entire truck carried brake rigging.

3. The combination with a car body and a supporting truck having spaced apart axles and wheels thereon outside the truck frame, brackets secured to the truck frame and projecting laterally thereof into the space between the wheels, brake shoes suspended from said brackets, live and dead levers pivotally carried by said brackets and each bearing on a brake shoe part but free of connection thereto, a compression link connecting said live and dead levers, and brake rigging carried by said car body and operably connected to said live levers to actuate the same.

4. The combination with a car body and a supporting truck having spaced apart axles and wheels thereon outside the truck frame, brackets secured to the truck frame and projecting laterally thereof into the space between the wheels, brake shoes suspended from said brackets, live and dead levers pivotally carried by said brackets and each bearing on a brake shoe part, a compression link connecting said live and dead levers, draft sills forming part of said body and slidably carrying an equalizer bar, tension links connecting said live levers and equalizer bar, and body carried mechanism for causing movement of said equalizer bar and thereby control said brake shoes.

5. The combination with a car body and a supporting truck having spaced apart axles and wheels thereon outside the truck frame, a bracket secured to the truck frame and projecting laterally thereof into the space between the wheels, brake shoes suspended from said bracket, a dead lever pivotally carried by said bracket and bearing on the adjacent brake shoe, a live lever pivotally and slidably mounted on said bracket and bearing on the brake shoe adjacent thereto, a compression link connecting said levers for joint operation, and body carried mechanism connected to said live lever to actuate the same and thereby control said brake shoes.

6. The combination with a car body and a supporting truck having spaced apart axles and wheels thereon outside the truck frame, spaced plates secured to the truck frame and forming a bracket projecting laterally of the truck frame into the space between the wheels, brake shoes carried by said bracket, connected live and dead levers pivotally carried and housed by the spaced plates forming the bracket, and body carried mechanism connected to said live lever to actuate the same and thereby control said brake shoes.

7. The combination with a car body and a supporting truck having spaced apart axles and wheels thereon outside the truck frame, spaced plates secured to the truck frame and forming a bracket projecting laterally of the truck frame into the space between the wheels, vertically extending links suspending brake shoes from said bracket, connected live and dead levers carried by the bracket and bearing at their lower ends on said brake shoes, said levers being inclined inwardly and upwardly of the truck side frame and at least in part housed by said spaced plates forming the bracket, and body carried mechanism connected to said live lever to actuate the same and thereby control said brake shoes.

8. The combination with a car body and a supporting truck having spaced apart axles and wheels thereon outside the truck frame, spaced plates secured to the truck frame and forming a bracket projecting laterally of the truck frame into the space between the wheels, vertically extending links suspending brake shoes from said bracket for swinging movement between the spaced plates, at least one of said spaced plates being cut to permit lateral removal of the brake shoes when disconnected, connected live and dead levers carried by the bracket and bearing at their lower ends on said brake shoes, said levers being inclined inwardly and upwardly of the truck side frame and at least in part housed by said spaced plates forming the bracket, and body carried mechanism connected to said live lever to actuate the same and thereby control said brake shoes.

9. The combination with a car body and a supporting truck having spaced apart axles and wheels thereon outside the truck frame, spaced plates secured to the truck frame and forming a bracket projecting laterally of the truck frame into the space between the wheels, brake shoes carried by said bracket and laterally removable therefrom, connected live and dead levers pivotally carried and housed by the spaced plates forming the bracket, and body carried mechanism connected to said live lever to actuate the same and thereby control said brake shoes.

ROBERT W. JOY.